Figure 1:
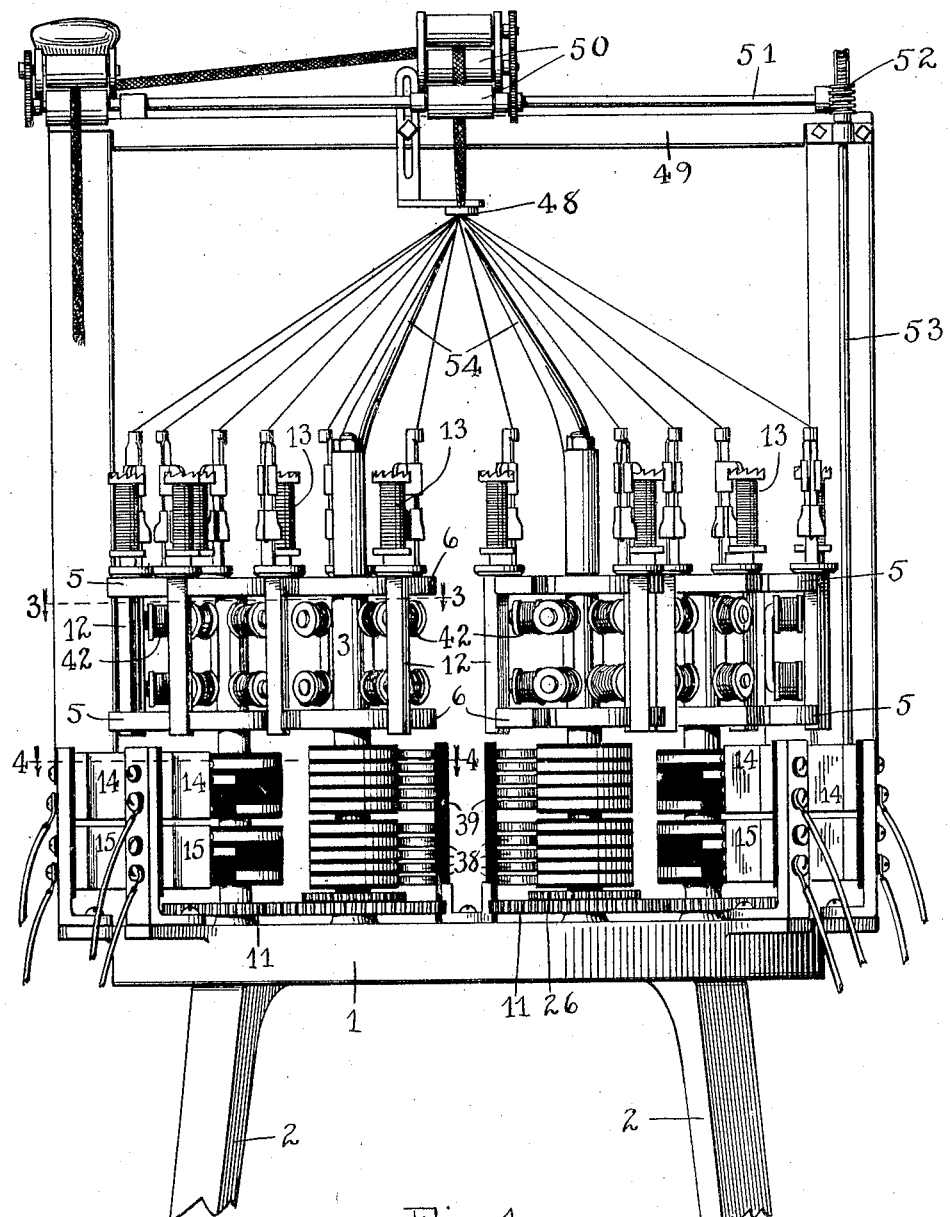

W. E. ELLIOTT.
BRAIDING MACHINE.
APPLICATION FILED MAY 9, 1913.

1,103,181.

Patented July 14, 1914.
5 SHEETS—SHEET 2.

Witnesses

Inventor
William E. Elliott
By Luther V. Moulton
Attorney.

W. E. ELLIOTT.
BRAIDING MACHINE.
APPLICATION FILED MAY 9, 1913.

1,103,181.

Patented July 14, 1914.
5 SHEETS—SHEET 3.

Witnesses
Harold O. Van Antwerp
Palmer A. Jones

Inventor
William E. Elliott
By Luther V. Moulton
Attorney.

W. E. ELLIOTT.
BRAIDING MACHINE.
APPLICATION FILED MAY 9, 1913.

1,103,181.

Patented July 14, 1914
5 SHEETS—SHEET 4.

Witnesses
Harold O. Van Antwerp
Palmer A. Jones

Inventor
William E. Elliott.
By Luther V. Moulton
Attorney

W. E. ELLIOTT.
BRAIDING MACHINE.
APPLICATION FILED MAY 9, 1913.
1,103,181.
Patented July 14, 1914.
5 SHEETS—SHEET 5.
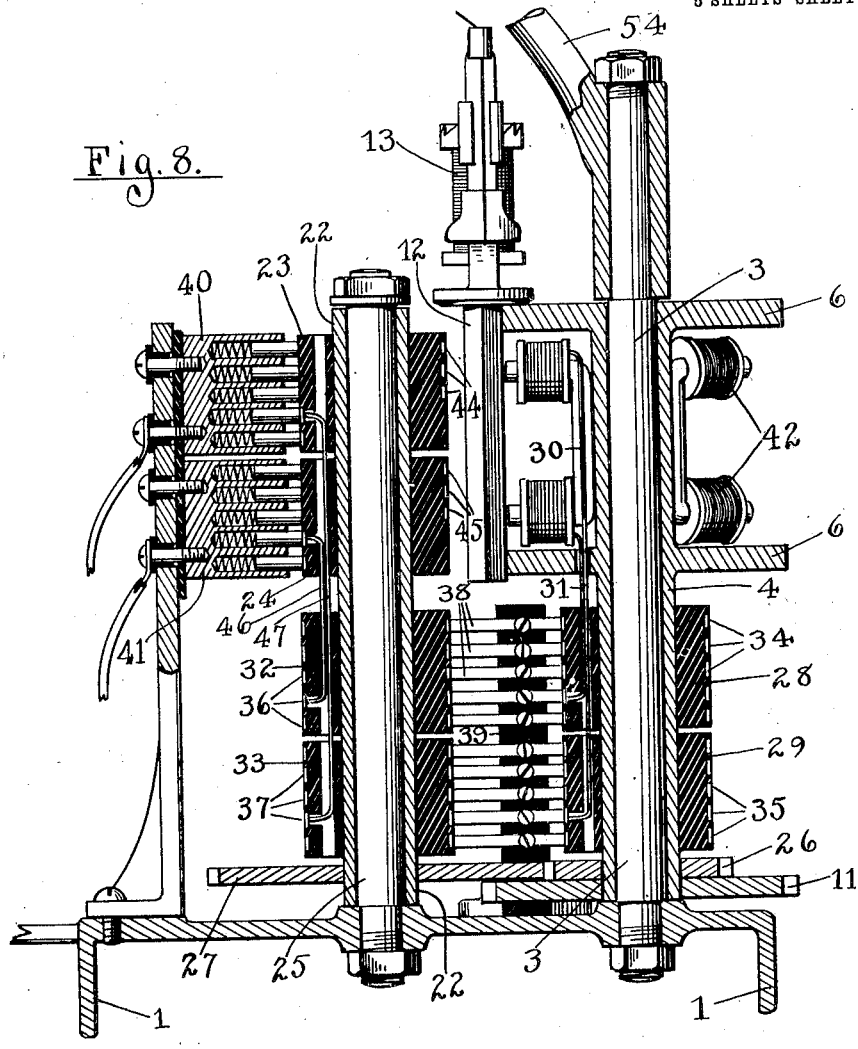
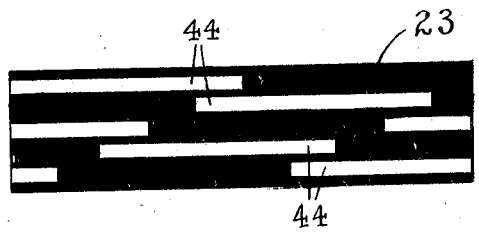
Fig. 9.
Witnesses
Harold O. Van Antwerp
Palmer A. Jones
Inventor
William E. Elliott
By Luther V. Moulton
Attorney

UNITED STATES PATENT OFFICE.

WILLIAM E. ELLIOTT, OF GRAND RAPIDS, MICHIGAN.

BRAIDING-MACHINE.

1,103,181.  Specification of Letters Patent.  Patented July 14, 1914.

Application filed May 9, 1913. Serial No. 766,658.

*To all whom it may concern:*

Be it known that I, WILLIAM E. ELLIOTT, a citizen of the United States of America, residing at Grand Rapids, in the county of Kent and State of Michigan, have invented certain new and useful Improvements in Braiding-Machines; and I do hereby declare the following to be a full, clear, and exact description of the invention, such as will enable others skilled in the art to which it appertains to make and use the same.

My invention relates to improvements in braiding machines and more particularly to that type of braiding machine wherein the bobbins carrying the thread, are carried around in opposite directions by a series of rotating disks and are transferred from one disk to the next in succession by means of magnets, and its object is to provide improved means for returning the bobbins at each end of the series and to provide the device with various new and useful features as hereinafter more fully described and particularly pointed out in the claims. In such machines for making tubular braid, the bobbins are respectively carried in the same direction continuously and in a complete circle, and in a machine arranged for making a flat braid, which is the one illustrated in the accompanying drawings, the series of rotating disks is separated at one point and each bobbin instead of continuously moving around the circle in the same direction, is carried around a disk at this gap or separation and re-traverses the series in the opposite direction until they reach a disk at the opposite side of the gap and again return. It is more practical to arrange this series of rotating disks for the flat braid in a circle as shown, so that the thread from each bobbin may be led to a centrally located point. In this type of braiding machine, the adjacent disks which carry the bobbins, are rotated in opposite directions and each bobbin in following its course from disk to disk, is carried throughout a half revolution on one disk, and is then transferred to the next and carried by this disk another half revolution and then transferred to the next and so on, and is thus caused to follow a serpentine path. Each disk of the series, except the end ones in the flat braiding machine, is preferably provided with four notches to receive the stems of the bobbins, and while in operation, enough bobbins are used to fill half the notches in the disks; there are thus continuously two bobbins carried by each disk and as the bobbins are transferred from one disk to another, each bobbin is carried alternately the opposite side of the disk from that of the preceding one, one half of the bobbins will thus move in opposite directions to the others and thus with half the bobbins traversing the series of disks in one direction and the balance moving in the opposite direction, their paths will constantly cross each other and the threads which lead from each bobbin to a common central point, will consequently be braided. In making flat braid the bobbin is carried wholly around the last disk in the series and returned over the course in the opposite direction, and this result is accomplished in the device shown by providing a larger disk at the end of the series adapted to carry a greater number of bobbins and to retain the same an entire revolution instead of only one half of a revolution.

Figure 2:
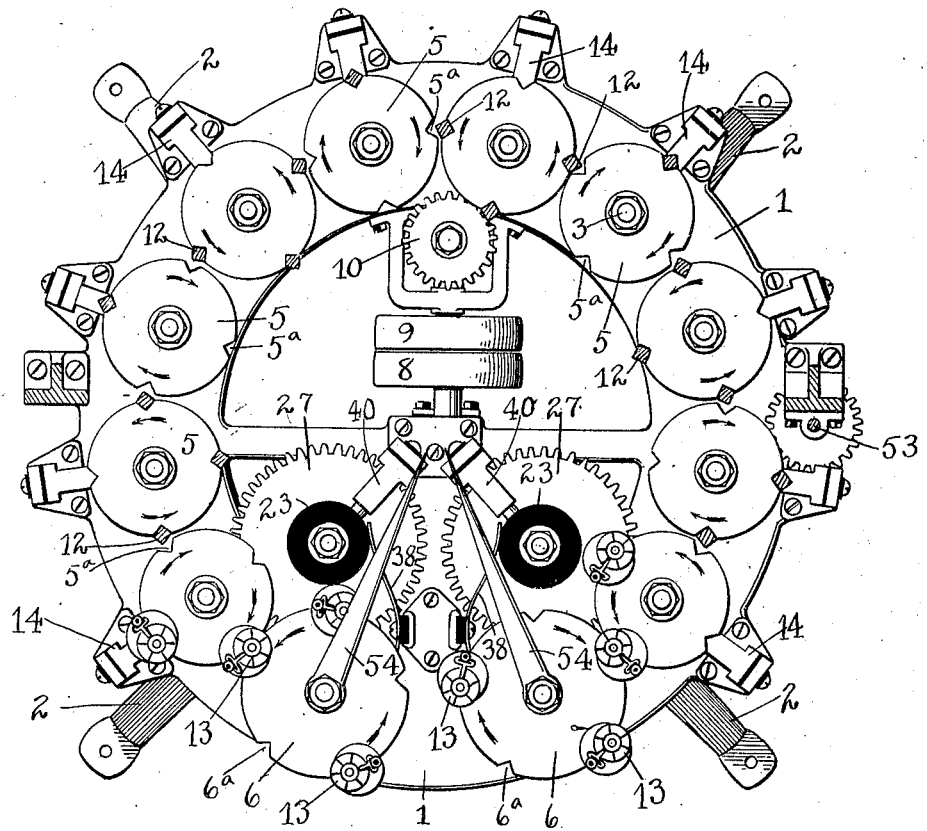
Figure 5:
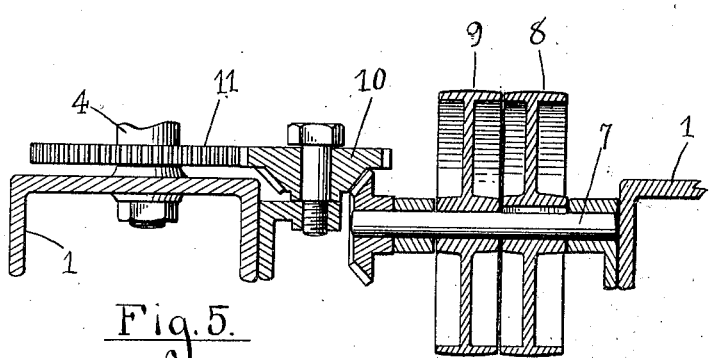
Figure 3:
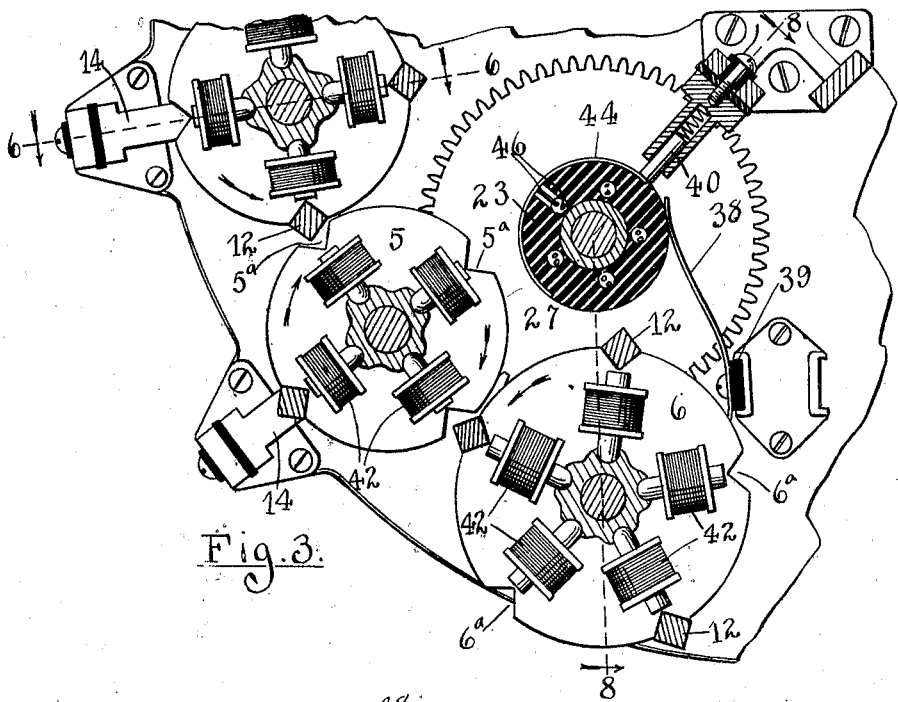
Figure 4:
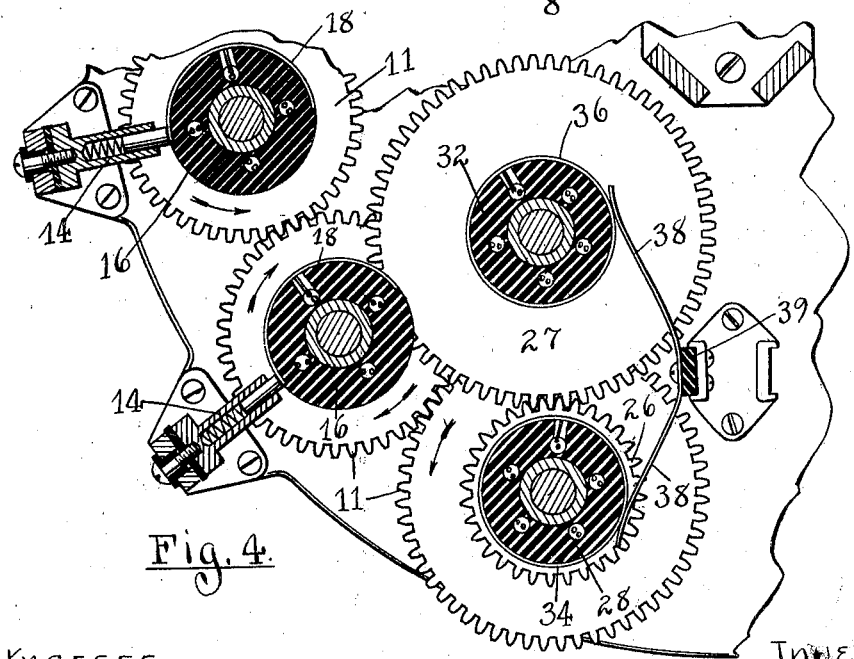
Figure 6:
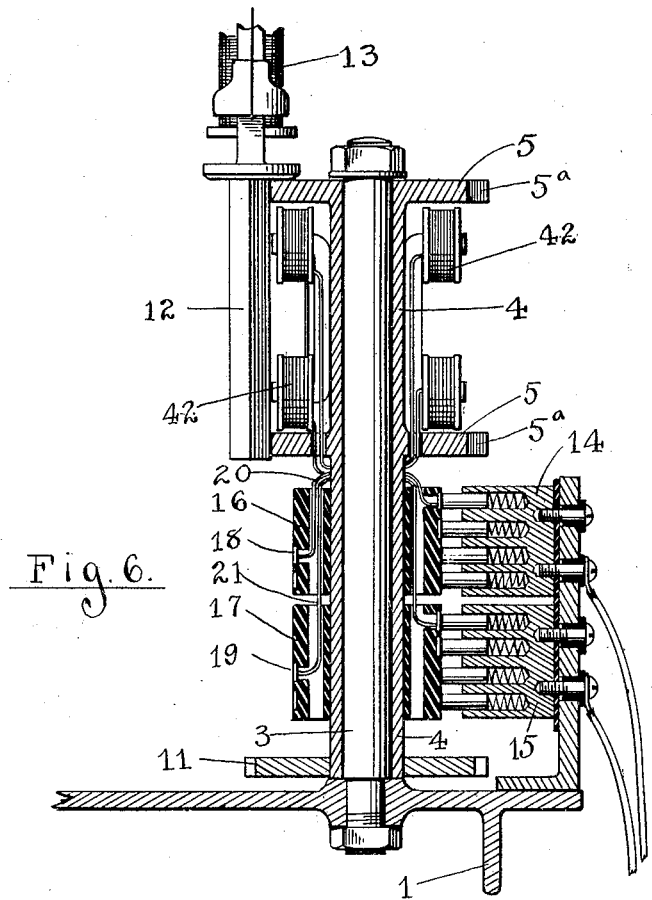
Figure 7:
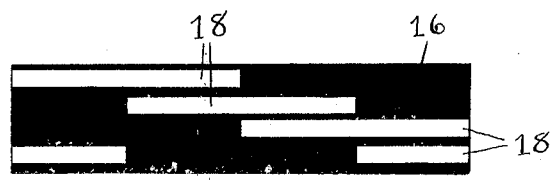

The construction, arrangement and operation of this device, will more fully appear by reference to the accompanying drawings, in which;

Figure 1 is an elevation of device embodying my invention; Fig. 2 is a plan view of the same with the upper portion of the frame removed; Fig. 3 is an enlarged sectional plan on the line 3—3 of Fig. 1, showing a portion of the series of rotating disks; Fig. 4 is an enlarged sectional plan on the line 4—4 illustrating the electrical contacts on the circuit controlling drums; Fig. 5 is an enlarged sectional detail through the axis of the driving shaft, illustrating the means for rotating the disks; Fig. 6 is an enlarged vertical section of one of the series of rotating disks, and its electrical circuit controlling drums; Fig. 7 is a plan development of the circuit controlling drum for one of the smaller rotating disks; Fig. 8 is a sectional elevation of one of the large end disks, together with its circuit controlling mechanism; and, Fig. 9 is a plan development of one of the circuit controlling drums for the large disks.

Like numbers refer to like parts in all of the figures.

1. represents the frame of the machine which is supported upon legs 2, is annular in plan view, and provided with a series of studs 3 circularly arranged and projecting vertically from the frame. These studs serve as bearings for sleeves 4, which carry the rotating disks 5 and are spaced apart so that the peripheries of the disks will be adjacent to each other.

The drawings illustrate my bobbin shifting device applied to a machine for making flat braid, and in this machine, a gap is formed at one point in the series of rotating disks, and the disk 6 adjacent each side of this gap is larger in diameter, having five notches 6ª in its periphery, instead of the four notches 5ª which are formed in the periphery of each of the smaller disks of the series.

The sleeve 4 of each set of disks is provided at its base with a gear 11 having a pitch diameter equal to the periphery of the disk and the gear on one sleeve meshes with the gear 11 on the sleeves adjacent to it and thus when set in motion, the series of disks will rotate and the peripheral speed of each disk, including also that of the larger ones will be uniform, but the direction of rotation of each adjacent disk will be opposite, consequently, half of the disks will rotate in one direction while the other half will rotate in the reverse direction. The preferred means for driving these disks, consists of a countershaft 7 journaled in the frame and provided with tight and loose pulleys 8 and 9, and geared to an idler gear 10, which in turn meshes with one of the gears 11 on the sleeve 4 of one of the sets of rotating disks.

Each of the intermediate sleeves is provided near its respective ends with two disks 5 superimposed and spaced apart. All the disks 5 of the intermediate series each have four V shaped notches 5ª equally spaced around the periphery, while the larger disks 6 at the respective ends of the series, are each provided with five notches 6ª. The bobbins are provided with square metallic stems 12 adapted to fit into the notches and long enough to span the space between the superimposed disks. The bobbins themselves are of any convenient type and are each adapted to carry a spool of thread 11 and each provided with thread tension devices for the same.

A U-shaped magnet 42 is arranged between the superimposed disks opposite each pair of the notches, and their poles extend radially from the sleeve and terminate just short of the inner extremity of the notches, and when energized, these magnets attract the metallic stems 12 of the bobbins which thus serve as armatures to the magnets and are held thereby within the notches. As the bobbins are only carried by the intermediate disks throughout one half of their revolution and are then transferred to the next adjacent disk, it is necessary to periodically energize and deënergize the magnets and to so time these excitations, that the bobbins will be attracted and held in the proper notches at the proper time.

The electrical current which is used to excite the magnets is taken from any convenient source, and connected to a set of stationary brushes opposite the lower portion of each sleeve 4 of the series of intermediate disks, there being two brushes 14 and 15 to simultaneously close the circuit for each magnet. These brushes engage separate drums 16 and 17 fixed on each sleeve 4 beneath the disks. The drums are made of insulated material and each drum provided with metallic contact segments 18 and 19, one contact plate being provided on each drum for each magnet to simultaneously engage the brushes and close the circuit. Conductors 20 and 21 connect the magnet coils with the segments on the respective drums and as these drums rotate, the segments will contact the brushes to complete the circuit for each respective magnet. Each pair of segments is so located upon the drums, that the circuit of each respective magnet will be closed at the time when the notches in the disks opposite it are to receive and hold an armature carrying a bobbin, this circuit being maintained throughout a half revolution of the disk until it is to be transferred to the adjacent disk at which point the contact segments pass the brushes and the circuit is broken.

In this type of machine, the smaller disks complete a cycle of operations during each rotation, or in other words, the function of each notch and its adjacent magnet, is identical and repeated each time the disk rotates, consequently, a contact drum mounted directly on the sleeve which carries the disks, suffices to make and break the circuits for the magnets of these disks at the proper time, but for the larger disks, adjacent the gap, the cycle of operations extends through two complete revolutions of the disks. It will be noted in connection with these larger disks that one pair of notches receives a bobbin and carries it completely around and back to the starting point, then transfers this bobbin to the adjacent smaller disk and the disk completes another revolution with this pair of notches empty. To accommodate this peculiarity of operation, I provide a half time sleeve 22 for each of these larger disks, which carries the contact drums 23 and 24 to close the circuits for the magnets carried by these disks. This half time sleeve 22 has a bearing on a stud 25 similar to the studs 6 upon which the rest of the sleeves are mounted and is driven by a small gear 26 fixed to one of the sleeves 4, which carries a pair of the larger disks; this small gear 26 meshing with a gear 27 having twice the diameter of the gear 26, which latter is fixed to the sleeve 22, thus driving the half time sleeve at half the speed of the large disks.

It is necessary before distributing and timing the current for the magnets of these larger disks, to first carry the current from the rotating sleeve 4 to the half time sleeve 22 and this is done by providing on the sleeve 4 beneath the disks two drums 28 and 29 of nonconducting material in each of which are set five metallic contact rings, one ring upon each drum being provided for each magnet and connected thereto by conductors 30 and 31. A pair of corresponding drums 32 and 33 are mounted on the half time sleeve 22 opposite the drums 28 and 29 and are provided with similar contact rings 36 and 37, and the current is carried from the rings of the drums on the sleeve 4 to the corresponding rings of the drums on the sleeve 22 by brushes 38; these brushes being fixed on an insulated post 39 rigidly attached to the frame.

The distributing and timing drums 23 and 24 are fixed upon the sleeve 22 above the drums 32 and 33, and are each provided with five metallic contact segments 44 and 45 on their periphery to correspond in number with the number of magnets upon the disks, and these segments are connected by conductors 46 and 47 to the contact rings 36 and 37 which are in direct electrical circuit with their respective magnets. A set of fixed brushes 40 and 41 is provided for each distributing drum. One brush on each drum being in the same circuit and simultaneously closes the circuit through a respective magnet coil. By this arrangement, the half time sleeve completes its cycle of operations during one revolution, but this one revolution of the half time sleeve, represents two revolutions of the disks 6 and it will be seen that with the contact segments 44 and 45 extending half the circumference of the drum, that as these drums rotate and the segments are engaged by the brushes 40 and 41, the circuit for each magnet will be closed during a whole revolution of the disks and open a like length of time and as on the drums for the smaller disks, each pair of contact segments is so located that it will be engaged by the brushes and the circuit closed at the proper time when its respective magnet is to be energized to attract a bobbin into the adjacent notches opposite it and the segments will leave the brush at the time this bobbin is to be released and transferred to the adjacent disk.

The object of providing square stems for the bobbins and V shaped notches in the disks to receive them, is to prevent the bobbins from rotating as the thread is drawn from the spools. The thread from each bobbin is drawn diagonally upward to a common central point where it passes through an eye 48, which is suspended from an elevated cross member of the frame 49, and it is directly beneath this eye 48 where the threads come together and cross, that the braiding is done and the braided thread after passing through the eye is drawn upward between rollers 50 and is led therefrom by any convenient mechanism. The rollers 50 are rotated by a shaft 51, which is in turn driven by a worm and gear 52 from a vertical shaft 53, which extends downward and is preferably driven from one of the gears 12. The thread in passing around the large disk 6 adjacent the gap, is guided and prevented from becoming entangled by a "needle" 54, one end of which is rigidly attached to the stud about which each of the large disks rotates and this needle projects angularly upward toward the eye 48 and terminates a short distance therefrom.

Although not illustrated in the drawings, it is obvious that fixed guide plates may be located adjacent the disks to prevent the bobbins dropping from place in case the electric circuit should be broken and to insure their remaining in the notches should the speed of the disks become so great as to cause them to fly therefrom by centrifugal force. This feature however, I do not consider essential to the operation of the device.

The operation of the device is as follows:—The series of rotating disks 5 and 6, are set in motion by rotation of the driving shaft 7 and the bobbins, of which there are two for each disk of the series and one extra one contained on one of the larger disks, immediately begin to follow their serpentine paths by being transferred from one disk to the next, etc., and as half the bobbins traverse the series in one direction, and the other half follow the serpentine path in the opposite direction, their paths continuously cross each other and the thread extending upward therefrom and converging at the eye 48, will be continuously crossed and braided to the desired shape. In order to transfer the bobbins from one disk to another, the magnets which attract the metallic stems, are constantly being energized and deënergized; this being accomplished in the smaller disks 5 of the series, by the contact of the various segments 18 and 19 on the controlling drums with the brushes 14 and 15, which close the circuit for their respective magnets; the current being led from the contact segments to and from the magnets by the conductors 20 and 21. In the larger disks 6 where the bobbins are carried completely around the axis before being transferred, the circuit is first closed by the contact of the brushes 40 and 41 with the contact segments 44 and 45 on the half time sleeve, and is then carried by conductors 46 and 47 to the corresponding contact rings 36 and 37 and is thence transferred through the brushes 38 to the contact rings 34 and 35 from where it is led by wires 30 and 31 to the proper magnet.

What I claim is:—

1. In a braiding machine, a series of rotating electro-magnets arranged to attract and hold bobbin carriers when excited, means for exciting the end magnets of the series comprising a commutator rotating once to two revolutions of the said magnets, and operating to excite each magnet during each alternate entire revolution of the said magnet, and commutators for the intermediate magnets rotating once at each revolution of the same, and operating to excite each magnet during only one half of each revolution.

2. In a braiding machine, a series of rotating disks, electro-magnets rotating with the disks, means for exciting the magnets rotating with the intermediate disks during one half of the revolution of the same, and means for exciting the magnets rotating with the disks at each end of the series comprising contact rings electrically connected to the respective magnet coils and rotating therewith, a corresponding series of half time contact rings rotating at one half the number of revolutions of the first named rings, brushes electrically connecting the opposite rings of the respective series, a corresponding series of segments rotating with the half time rings and respectively connected to the same, and a series of brushes engaging the segments.

3. In a braiding machine, a series of rotating sleeves carrying rotating disks, electro-magnets mounted on the sleeves to attract and hold bobbin carriers, means for exciting the magnets of the intermediate sleeves during one half of the revolution of the same comprising segments on the sleeves, and brushes contacting the segments, contact rings mounted on the end sleeves of the series, a half time sleeve arranged to rotate one revolution to two revolutions of the respective end sleeve, a corresponding series of contact rings on said half time sleeve, brushes connecting opposite rings on the two sleeves, a series of segments on the half time sleeve connected to the respective rings on the same, a series of brushes engaging the segments, and conductors connected to the said brushes.

4. The combination with a braiding machine having a series of adjacent rotating disks in which the end disks of the series are larger in diameter than the other disks in the series and all of the disks provided with recesses, metallic bobbin carriers adapted to be carried by the disks and transferred from one to the other and carried completely around the end disks, of transferring mechanism, comprising electromagnets opposite the notches to attract the bobbin carriers into the same, a rotatable sleeve for each set of end disks and rotating at half the speed thereof, means for transferring the electrical current from each magnet to the said sleeve, and means mounted upon the sleeve for intermittently making and breaking the electric circuit, to energize and deënergize the magnets to alternately attract and release the bobbins.

5. The combination with a braiding machine having a series of adjacent rotating disks, the end disk of the series being larger in diameter than the other disks of the series and all of said disks provided with notches, metallic bobbin carriers carried by the disks transferred from one of said disks to the other and carried completely around the end disks, transferring mechanism for the end disks comprising, electro magnets opposite the notches to attract the bobbin carriers into the same, a half time sleeve adjacent each end disk adapted to rotate at half the speed thereof, contact rings for each magnet electrically connected thereto, also connected to the disks and rotating therewith, corresponding contact rings on the half time sleeve, transfer brushes engaging the contact rings on the disk and those on the sleeve, contact segments fixed on the half time sleeve and rotating therewith, corresponding in number with the contact rings and electrically connected therewith, and fixed brushes carrying an electrical current and adapted to engage the contact segments.

In testimony whereof I affix my signature in presence of two witnesses.

WILLIAM E. ELLIOTT.

Witnesses:
HAROLD O. VAN ANTWERP,
LUTHER V. MOULTON.

Copies of this patent may be obtained for five cents each, by addressing the "Commissioner of Patents, Washington, D. C."